(12) United States Patent
Dieudonne et al.

(10) Patent No.: US 12,291,764 B2
(45) Date of Patent: *May 6, 2025

(54) SILICON BASED ALLOY, METHOD FOR THE PRODUCTION THEREOF AND USE OF SUCH ALLOY

(71) Applicant: ELKEM ASA, Oslo (NO)

(72) Inventors: Amelie Dieudonne, Ste Colombe (FR); Ole Svein Klevan, Stjordal (NO)

(73) Assignee: ELKEM ASA, Oslo (NO)

( * ) Notice: Subject to any disclaimer, the term of this patent is extended or adjusted under 35 U.S.C. 154(b) by 119 days.

This patent is subject to a terminal disclaimer.

(21) Appl. No.: 18/306,647

(22) Filed: Apr. 25, 2023

(65) Prior Publication Data

US 2023/0257858 A1    Aug. 17, 2023

Related U.S. Application Data

(62) Division of application No. 17/044,950, filed as application No. PCT/NO2019/050067 on Apr. 2, 2019, now abandoned.

(30) Foreign Application Priority Data

Apr. 3, 2018 (NO) .................................. 20180441

(51) Int. Cl.

| C22C 38/02 | (2006.01) |
|---|---|
| C22C 28/00 | (2006.01) |
| C22C 33/04 | (2006.01) |
| C22C 33/06 | (2006.01) |
| C22C 35/00 | (2006.01) |
| C22C 38/00 | (2006.01) |
| C22C 38/04 | (2006.01) |
| C22C 38/06 | (2006.01) |
| C22C 38/14 | (2006.01) |

(52) U.S. Cl.
CPC .............. *C22C 38/02* (2013.01); *C22C 28/00* (2013.01); *C22C 33/04* (2013.01); *C22C 33/06* (2013.01); *C22C 35/00* (2013.01); *C22C 38/002* (2013.01); *C22C 38/04* (2013.01); *C22C 38/06* (2013.01); *C22C 38/14* (2013.01)

(58) Field of Classification Search
None
See application file for complete search history.

(56) References Cited

U.S. PATENT DOCUMENTS

| 2,207,282 | A | 7/1940 | Brennan |
| 2,301,360 | A | 11/1942 | Brennan |
| 2,608,482 | A | 8/1952 | Brennan et al. |
| 2,866,701 | A | 12/1958 | Strauss |
| 2021/0140020 | A1 | 5/2021 | Dieudonne et al. |

FOREIGN PATENT DOCUMENTS

| AR | 023865 A1 | 9/2002 |
|---|---|---|
| BE | 495194 A | 8/1950 |
| CN | 1228482 C | 11/2005 |
| CN | 103602846 A | 2/2014 |
| CN | 105039833 A | 11/2015 |
| CN | 107429306 A | 12/2017 |
| EP | 3075869 A1 | 10/2016 |
| GB | 930523 A | 7/1963 |
| GB | 1004443 A | 9/1965 |
| JP | S4418058 Y1 | 8/1969 |
| JP | S45429 Y1 | 1/1970 |
| JP | S58141361 A | 8/1983 |
| KR | 10-2005-0062260 A | 6/2005 |
| KR | 10-1030552 B1 | 4/2011 |
| KR | 20170126000 A | 11/2017 |
| RU | 2082785 C1 | 6/1997 |
| SU | 486072 A1 | 9/1975 |
| SU | 380734 A1 | 5/1979 |
| SU | 1242536 A1 | 7/1986 |
| WO | 0070113 A1 | 11/2000 |

OTHER PUBLICATIONS

International Search Report and Written Opinion for Corresponding International Application No. PCT/NO2019/050067 (10 Pages) (Jun. 13, 2019).
Search Report for Corresponding Taiwanese Application No. 108111469 (1 Page) (Jan. 30, 2020).
Search Report for Corresponding Norwegian Application No. 20180441 (2 Pages) (Oct. 26, 2018).
International Preliminary Report on Patentability for Corresponding International Application No. PCT/NO2019/050067 (13 Pages) (Jun. 30, 2020).
Examination Report for Corresponding Indian Application No. 202047047192 dated Dec. 27, 2021; 6 pages.
Search Report for Corresponding Argentinian Application No. 20190100865, 2 pages, Jul. 1, 2022.
Clean Steel: Part Three :: "Total Materia Article", May 31, 2007 (Abstract). Retrieved from the Internet: URL:https://www.totalmateria.com/paqe.aspx?ID=CheckArticle&site=kts&NM=200.
International Search Report and Written Opinion, corresponding International Application No. PCT/NO2019/050116, mailing date Aug. 12, 2019 (13 pages).
International Preliminary Report on Patentability, corresponding International Application No. PCT/NO2019/050116, mailing date Apr. 28, 2020 (14 pages).
Chinese Search Report for Corresponding Chinese Application No. 201980038673.7, issued Aug. 27, 2021.

*Primary Examiner* — Brian D Walck

(74) *Attorney, Agent, or Firm* — LUCAS & MERCANTI, LLP

(57) ABSTRACT

A method for producing a silicon based alloy having between 45 and 95% by weight of Si; max 0.05% by weight of C; 0.01-10% by weight of Al; 0.01-0.3% by weight of Ca; max 0.10% by weight of Ti; 0.5-25% by weight of Mn; 0.005-0.07% by weight of P; 0.001-0.005% by weight of S; the balance being Fe and incidental impurities in the ordinary amount.

8 Claims, No Drawings

SILICON BASED ALLOY, METHOD FOR THE PRODUCTION THEREOF AND USE OF SUCH ALLOY

CROSS-REFERENCE TO RELATED APPLICATIONS

This Application is a divisional of U.S. application Ser. No. 17/044,950, filed on Oct. 2, 2020 which in turn is a 371 of PCT/NO2019/050067 filed on Apr. 2, 2019 which, in turn, claimed the priority of Norwegian Patent Application No. 20180441 filed on Apr. 3, 2018, both applications are incorporated herein by reference.

TECHNICAL FIELD

The present invention relates to a silicon based alloy, a method for the production thereof and the use of such alloy.

BACKGROUND ART

Ferrosilicon (FeSi) is an alloy of silicon and iron and is an important additive in the manufacture of steel products. Such alloys are commonly referred to as ferrosilicon alloys but when the silicon content is high and/or when the contents of alloying elements are high, there will be a very small amount of iron in the alloy, and therefore, the term silicon (Si) alloys are also used to denote such alloys. Silicon in the form of ferrosilicon is used to remove oxygen from the steel and as an alloying element to improve the final quality of the steel. Silicon increases namely strength and wear resistance, elasticity (spring steels), scale resistance (heat resistant steels), and lowers electrical conductivity and magnetostriction (electrical steels). See example of prior art ferrosilicon qualities produced by Elkem in table 1. Special ferrosilicon like LAl (low aluminium), HP/SHP (High Purity/Semi High Purity) and LC (low carbon) ferrosilicon are used in the production of special steel qualities, such as electrical steel, stainless steel, bearing steel, spring steel, and tire cord steel.

TABLE 1

Examples of qualities in ferrosilicon alloys (all in weight %)

| Qualities | Si | Al max | Ti max | C max |
|---|---|---|---|---|
| Standard FeSi | 74-78 | 1.5 | 0.1 | 0.1 |
| LC FeSi | 74-78 | 1.0 | 0.1 | 0.02 |
| LAl FeSi | 74-78 | 0.1 | 0.1 | 0.04 |
| SHP FeSi | 74-78 | 0.1 | 0.05 | 0.02 |
| HP FeSi | 74-78 | 0.05 | 0.02 | 0.02 |

Non-grain oriented electrical steel (NGOES) is essential to manufacture magnetic cores of electrical machines such as motors, generators and transformers. NGOES are usually alloyed with silicon in the range of 0.1-3.7 weight % (wt %) depending on producer and quality but also higher Si levels can be found. Grades with low levels (typically <1.5 wt % Si) of Si are referred here as low grade while the ones with higher levels (>2/2.5 wt %) of silicon are often called high grade. The demand for high grade NGOES is increasing worldwide, driven by increasing electrification (like electromobility) and $CO_2$ emissions reduction. There is therefore a need to develop new NGOES grades, which in turn call for better solutions to be able to produce or develop such grades.

NGOES requires having the carbon content as low as possible (typically C<0.005 wt %). In the production of NGOES, low carbon alloys should be used in order to minimize carbon pollution in the steel as much as possible. Additional and costly process steps would be needed to obtain the required low carbon level if the carbon level in the steel melt is too high due to pollution from added alloys. This is why low carbon ferrosilicon/silicon alloys have been and are still widely used in the making of NGOES, either in the form of LC, LAl or HP/SHP FeSi.

Recently, manganese is being increasingly used as an alloying element in high grade NGOES. One major source of carbon pollution in the production of such steel grades in addition to silicon alloys is the manganese alloys used. To keep the added carbon low, expensive grades of manganese like low carbon ferromanganese (LCFeMn) or manganese metal is often used. Current practice involves using separately addition of low carbon silicon based alloy, like LC, LAl or HP/SHP FeSi and low carbon manganese based alloy, like low carbon ferromanganese (LC FeMn) or manganese metal, to achieve the desired Si and Mn level in the steel while keeping carbon in the steel as low as possible. Low carbon silicon alloys and low carbon ferromanganese alloys are both costly to produce and requires separate addition of these alloys to the steel.

The main polluting element in manganese based alloys is carbon that can be from 0.04 to 8 wt %. Examples of commercial Mn alloys are high carbon ferromanganese (HC FeMn) having a carbon content from 6 to 8 wt % typically, medium carbon ferromanganese (MC FeMn) with typically 1-2 wt % C and low carbon ferromanganese (LCFeMn) with about 0.5 wt % C. Also available are electrolytic manganese having down to max 0.04 wt % C. Other alloys can be available with different carbon content up to 8%. It is also worth noting that the lowest carbon content in Mn alloys is found in electrolytic manganese, whose production process is known to create environmental issues and are very costly to produce. Table 2 below shows examples of commercial manganese alloys.

TABLE 2

Examples of commercial manganese alloys (all in wt %)

| Alloy | Mn | C max | P max | Si max | S max | Source |
|---|---|---|---|---|---|---|
| HC FeMn | Min. 78 | 6.5-7.5 | 0.20 | 0.3 | 0.01 | Eramet |
| MC FeMn | 80-83 | 1.5 | 0.20 | 0.6 | 0.01 | Eramet |
| LC FeMn | 80-83 | 0.5 | 0.20 | 0.6 | 0.01 | Eramet |
| Mn metal electrolytic | Min. 99.7 | 0.04 | 0.005 | NA | 0.05 | Changsha Xinye Ind. Co. Ltd |
| Mn metal silicothermic | Min. 95 | 0.2 | 0.07 | 1.8 | 0.05 | Felman trading |

There are several challenges with the current production method of NGOES containing Mn such as processing time due to separate additions of silicon alloy and manganese alloy, cost and quality and that high amount of alloys has to be added.

Thus, the object of the present invention is to provide a new cost efficient silicon based alloy having a low carbon content and containing manganese that can be used as a single alloy addition to steel qualities such as NGOES that require low carbon content and a certain manganese content.

Another object is to provide a method of producing said Si based alloy.

A further object is to provide the use of said Si based alloy.

These and other advantages with the present invention will become evident in the following description.

SUMMARY OF INVENTION

In a first aspect, the present invention relates to a silicon based alloy comprising between 45 and 95% by weight of Si;
 max 0.05% by weight of C;
 0.01-10% by weight of Al;
 0.01-0.3% by weight of Ca;
 max 0.10% by weight of Ti;
 0.5-25% by weight of Mn;
 0.005-0.07% by weight of P;
 0.001-0.005% by weight of S;
 the balance being Fe and incidental impurities in the ordinary amount.

In an embodiment, the silicon based alloy comprises between 50 and 80% by weight of Si.

In another embodiment, the silicon based alloy comprises between 64 and 78% by weight of Si.

In an embodiment, the silicon based alloy comprises max 0.03% by weight of C.

In an embodiment, the silicon based alloy comprises 0.01-0.1% by weight of Ca.

In an embodiment, the silicon based alloy comprises max 0.06% by weight of Ti.

In an embodiment, the silicon based alloy comprises 1-20% by weight of Mn.

In a second aspect, the present invention relates to a method for producing a silicon based alloy as defined above, wherein said method comprises providing a liquid base ferrosilicon alloy and adding a Mn source comprising carbon as an alloying element or as an impurity element into said liquid ferrosilicon thereby obtaining a melt, and refining said obtained melt, the refining comprising removing formed silicon carbide particles before and/or during casting of said melt.

In an embodiment, the added Mn is in the form of high carbon ferromanganese alloy, medium carbon ferromanganese alloy, low carbon ferromanganese alloy, Mn metal or a mixture thereof.

In an embodiment, the liquid base ferrosilicon alloy comprises:
 Si: 45-95 wt %;
 C: up to 0.5 wt %;
 Al: up to 2 wt %;
 Ca: up to 1.5 wt %;
 Ti: 0.01-0.1 wt %;
 Mn: up to 0.5 wt %;
 P: up to 0.02 wt %;
 S: up to 0.005 wt %;
 the balance being Fe and incidental impurities in the ordinary amount.

In an embodiment, Al is added to adjust the Al content within the range 0.1-10 wt %.

In another aspect, the present invention relates to the use of the silicon based alloy as defined above as an additive in the manufacturing of steel.

In an embodiment, the present invention relates to the use of the silicon based alloy as defined above as an additive in the manufacturing of non-grain oriented electrical steel.

DETAILED DESCRIPTION OF THE INVENTION

According to the present invention it is provided a new silicon based alloy that is low in carbon and with a manganese content up to 25% by weight.

The alloy according to the invention has the following composition:
 Si: 45-95 wt %;
 C: max 0.05 wt %;
 Al: 0.01-10 wt %;
 Ca: 0.01-0.3 wt %;
 Ti: max 0.10 wt %;
 Mn: 0.5-25 wt %;
 P: 0.005-0.07 wt %;
 S: 0.001-0.005 wt %;
 the balance being Fe and incidental impurities in the ordinary amount.

In the present application, the terms silicon based alloy and ferrosilicon based alloy are used interchangeably. Si is the main element in this alloy to be added to the steel melt. Traditionally, 75 wt % Si or 65 wt % Si are used. Ferrosilicon with 75 wt % Si gives higher temperature increase of the steel melt when added than 65 wt % Si, which is almost temperature neutral. Ferrosilicon with lower than 50 wt % Si is rarely used in the steel industry today, and mean that a high amount of alloy would have to be added to get to the targeted Si content in the steel and creating challenges during steelmaking. Higher than 80% is seldom used today, as the production cost per silicon unit increases when the silicon content in the Si based alloy increases. Hence, a preferred Si range is 50-80 wt %. Another preferred Si range is 64-78 wt %.

Carbon is the main unwanted element in NGOES and should be as low as possible in this new alloy according to the invention. A maximum content of carbon in said alloy is 0.05 wt %. A preferred content should be max 0.03 wt % or even max 0.02 wt %, as in current low carbon ferrosilicon grades used in making said steel. It might be difficult to totally remove carbon and therefore normally 0.003 wt % C can be present in the alloy according to the invention. More than the carbon content itself, the carbon to manganese ratio is the one key parameter. With manganese increasing in the alloy, the carbon content in the new silicon based alloy according to the invention can be max 0.05 wt %.

Aluminium is an impurity in the production of silicon based alloy, typically around 1 wt % out of the furnace in standard grade. It can be refined down to a maximum of 0.01 wt % although for NGOES a maximum of 0.03 wt % or even max 0.1 wt % would be good solutions. However, in NGOES, Al is often added in small or large quantities. Therefore, adding aluminium up to 5 wt % or even up to 10 wt % in the alloy according to the invention can in some instances be preferable.

Calcium is an impurity in the production of silicon based alloys, and should be kept low to avoid problems during steelmaking and casting, such as nozzle clogging. In the alloy according to the invention, the calcium range is 0.01-0.3 wt %. A preferred calcium range is 0.01-0.1 wt %. A preferred content is max 0.05 wt %. If the calcium content in the starting material for producing the alloy according to the invention is higher than the desired calcium content in said alloy, calcium can easily be removed during the production by blowing/stirring with oxygen (from air and/or pure oxygen) thereby forming calcium oxide that can be removed as slag.

Titanium is an impurity in the production of silicon based alloys, typically around 0.08 wt % out of the furnace in 75 wt % FeSi standard production, but that depends on the raw material mix. However, in NGOES, a low content of titanium is often beneficial, to avoid formation of detrimental inclusions. Therefore, a Ti level of max 0.06 wt % or even max 0.03 wt % in the new alloy according to the invention is preferable. Traces of Ti might be present in said alloy, so that a minimum level of Ti can be 0.005% by weight. It is difficult to refine Ti in the ladle, so good furnace operation and raw material selection are required to succeed in getting low titanium content.

Manganese is typically an impurity in the production of silicon based alloys. However, the inventors surprisingly found that alloying a silicon based alloy with manganese in the range of 0.5 to 25% while keeping the carbon content low provides an alloy with excellent properties particularly for the use in the production of steel qualities requiring low carbon content such as NGOES. Other possible Mn ranges are 1-20%, or 1-15% or also 2-10%.

Phosphorous is an impurity in the production of silicon based alloys. In particular, in silicon based alloys without Mn additions, P levels are below 0.04%. However, P is normally higher in Mn alloys, therefore alloying with Mn may lead to a higher P content in the final product. However, P in the steel originating from addition of the silicon alloy of the present invention will be the same or slightly lower than from separate addition of silicon alloy and manganese alloy.

Sulphur is usually low in silicon alloys production. However, S is normally slightly higher in Mn alloys, so alloying with Mn may lead to higher S in the final product. However, S in the steel originating from addition of the silicon alloy of the present invention will be the same or slightly lower than from separate addition of silicon alloy and manganese alloy.

A preferred composition of the alloy according to the invention is:

Si: 64-78 wt %;
C: max 0.03 wt %;
Al: 0.1-10 wt %;
Ca: 0.01-0.05 wt %;
Ti: max 0.06 wt %;
Mn: 1-20 wt %;
P: 0.005-0.05 wt %;
S: 0.001-0.005 wt %;
the balance being Fe and incidental impurities in the ordinary amount.

The alloy according to the present invention is made by adding a Mn source comprising carbon as an alloying element or as an impurity element into a liquid Si based alloy. The Mn source can be in the form of solid or liquid manganese units, in the form of a manganese alloy or manganese metal or a mixture thereof. The manganese source can comprise normal impurities/contaminants. The manganese alloy can for example be a ferromanganese alloy, such as high carbon ferromanganese, medium carbon ferromanganese, low carbon ferromanganese or a mixture thereof. A commercial manganese alloy, for example as given in table 2 above, or a combination of two or more of such alloys, are suitable for use in the present invention. Preferably the added Mn is in the form of high carbon ferromanganese or medium carbon ferromanganese.

The added carbon from the manganese source will react with silicon thereby forming solid SiC (silicon carbide) particles that during refining are removed from the melt to the ladle refractory or to any slag that has been formed before or during the casting process, preferably with stirring in the ladle. Slag formers can be added if needed to have a sufficiently large receptor for the formed SiC particles. This results in a Si alloy according to the invention with low carbon content and containing manganese, with the range of elements as indicated above.

An example of a composition for the starting material could be liquid FeSi from furnace, but many others are possible depending on the final specification to be reached. Remelting any commercial silicon based alloys like standard ferrosilicon or high purity ferrosilicon could also be a possible starting material.

Thus, a possible starting material can comprise:
Si: 45-95 wt %;
C: up to 0.5 wt %;
Al: up to 2 wt %;
Ca: up to 1.5 wt %;
Ti: 0.01-0.1 wt %;
Mn: up to 0.5 wt %;
P: up to 0.02 wt %;
S: up to 0.005 wt %;
the balance being Fe and incidental impurities in the ordinary amount.

If the aluminium content is to be increased in the final product (up to 10%), addition of solid or liquid aluminium units can be made in the ladle. Alternatively, aluminium from the furnace can be increased by selection of raw materials to the furnace. Al can be added to adjust the Al content within the range 0.01-10 wt %.

To produce the alloy according to the invention, additional steps involving slag refining, skimming and/or stirring according to generally known techniques can be performed, in particular to reach the low levels of carbon claimed by the present invention. Such steps can be performed before or during the casting process or in combination.

The following Examples illustrate the present invention without limiting its scope.

Example 1

In two separate trials, ferrosilicon was tapped as normal into a tapping ladle (Ladle 1 and Ladle 2) with bottom stirring with air. The amount of ferrosilicon that was tapped was about 5900 kg into each of Ladle 1 and Ladle 2. Table 3 shows the starting material composition in the two ladles used.

TABLE 3

| Starting material | Starting materials (wt %) | | | | | | |
|---|---|---|---|---|---|---|---|
| | Al | Si | P | Ca | Ti | Mn | C |
| Ladle 1 | 0.78 | 77.26 | 0.012 | 0.16 | 0.058 | 0.172 | 0.0533 |
| Ladle 2 | 1.60 | 75.25 | 0.011 | 0.98 | 0.057 | 0.234 | 0.3794 |

After tapping, lumpy FeMn, with 75.7 wt % Mn and 6-8 wt % C; the balance being Fe and incidental impurities in the ordinary amount, was added into the liquid ferrosilicon in each ladle in an amount equal to 246 kg of Mn unit to reach 4.5% Mn in the final product. As the Mn yield was not known, FeMn was added gradually over a period between 20-25 minutes until the Mn target of 4.5% was reached. (Additions can be done in a shorter or longer time). The bottom stirring was kept during the whole addition process, ensuring good Mn dissolution and that formed SiC particles were removed from the Si alloy melt to the slag formed and the ladle walls. After the refining step, the ladles were taken to the casting area where final liquid sample was taken before casting into cast iron moulds.

Samples of the new alloy produced according to the invention were taken at the end of the liquid stage, just prior to casting. Results of the two ladles are shown in table 4.

All samples were analyzed with XRF (Zetium® from Malvern Panalytical) for Al, Si, P, Ca, Ti, Mn, and for C, LECO® CS-220 (combustion analysis) was used.

TABLE 4

Analysis (wt %) at the end of liquid stage

| | Al | Si | P | Ca | Ti | Mn | C |
|---|---|---|---|---|---|---|---|
| Ladle 1 | 0.27 | 74.18 | 0.016 | 0.02 | 0.057 | 4.43 | 0.018 |
| Ladle 2 | 0.22 | 73.47 | 0.015 | 0.01 | 0.058 | 4.74 | 0.008 |

Example 2

Liquid ferrosilicon was tapped as normal into a tapping ladle with bottom stirring with air. The amount of ferrosilicon that was tapped into the ladle was about 6000 kg. The starting material composition can be seen in table 5.

During tapping, lumpy FeMn, with 78.4 wt % Mn and 6.85 wt % C; the balance being Fe and incidental impurities in the ordinary amount, was added into the liquid ferrosilicon in an amount equal to 950 kg. Together with FeMn, 100 kg of quartz was added to the melt to increase the volume of receptors to support the capture of the formed SiC. The bottom stirring was kept during the whole addition process, ensuring good Mn dissolution and that formed SiC particles were removed from the FeSi alloy melt to the ladle walls and slag formed. After the refining step, the ladle was taken to the casting area where final liquid sample was taken before casting into cast iron moulds.

Samples of the new alloy produced according to the invention were taken at the end of the liquid stage, just prior to casting, and on final product after casting. Results are shown in table 5.

All samples were analyzed with XRF (Zetium® from Malvern Panalytical) for Al, Si, P, Ca, Ti, Mn, and for C, LECO® CS-220 (combustion analysis) was used.

TABLE 5

Chemical composition (wt %) at different steps of the experiment

| | Al | Si | P | Ca | Ti | Mn | C |
|---|---|---|---|---|---|---|---|
| Starting material | 0.57 | 75.66 | 0.008 | 0.33 | 0.017 | 0.21 | 0.030 |
| Before casting | 0.10 | 68.71 | 0.021 | 0.03 | 0.018 | 9.04 | 0.004 |
| Final product | 0.09 | 68.76 | 0.019 | 0.03 | 0.018 | 8.91 | 0.005 |

By applying such method, the inventors achieved a low carbon level, which can be explained by the low solubility of carbon in high silicon alloys. It was however surprising that it was possible to reach carbon levels as low as in current low carbon ferrosilicon grades (see table 1).

The alloy according to the invention is a cost-efficient alternative to separately adding the required alloying elements Si and Mn separately as ferrosilicon and manganese alloy or a manganese metal, by improving process time and quality. Said alloy could also help NGOES producers to decrease the overall carbon content in the steel and reach a lower level than by adding ferrosilicon/Si based alloy and manganese in the form of low carbon manganese alloy or manganese metal separately. Further, said alloy could allow electrical steel producers to make new grades with higher Mn level and at the same keep the carbon content low in the steel using only one alloy additive.

Having described different embodiments of the invention it will be apparent to those skilled in the art that other embodiments incorporating the concepts may be used. These and other examples of the invention illustrated above are intended by way of example only and the actual scope of the invention is to be determined from the following claims.

The invention claimed is:

1. A method for producing a silicon based alloy comprising
between 45 and 95% by weight of Si;
max 0.05% by weight of C;
0.01-10% by weight of Al;
0.01-0.3% by weight of Ca;
max 0.10% by weight of Ti;
1-25% by weight of Mn;
0.005-0.07% by weight of P;
0.001-0.005% by weight of S;
the balance being Fe and incidental impurities in the ordinary amount, wherein said method comprises:
providing a liquid base ferrosilicon alloy comprising
Si: 45-95 wt %;
C: up to 0.5 wt %;
Al: up to 2 wt %;
Ca: up to 1.5 wt %;
Ti: 0.01-0.1 wt %;
Mn: up to 0.5 wt %;
P: up to 0.02 wt %;
S: up to 0.005 wt %;
the balance being Fe and incidental impurities in the ordinary amount,
adding a Mn source in the form of high carbon ferromanganese alloy having a carbon content of from 6 to 9 wt %, medium carbon ferromanganese alloy having a carbon content of from 1 to 2 wt %, low carbon ferromanganese alloy having a carbon content of about 0.5 wt %, Mn metal, or a mixture thereof, into said liquid ferrosilicon thereby obtaining a melt, and
refining said obtained melt, the refining comprising removing formed silicon carbide particles before and/or during casting of said melt.

2. The method according to claim 1, wherein Al is added to adjust the Al content within the range 0.01-10 wt %.

3. The method according to claim 1, wherein the silicon based alloy comprises between 50 and 80% by weight of Si.

4. The method according to claim 3, wherein the silicon based alloy comprises between 64 and 78% by weight of Si.

5. The method according to claim 1, wherein the silicon based alloy comprises max 0.03% by weight of C.

6. The method according to claim 1, wherein the silicon based alloy comprises between 0.01-0.1% by weight of Ca.

7. The method according to claim 1, wherein the silicon based alloy comprises max 0.06% by weight of Ti.

8. The method according to claim 1, wherein the silicon based alloy comprises between 1-20% by weight of Mn.

* * * * *